(12) United States Patent
Gale

(10) Patent No.: US 9,565,112 B2
(45) Date of Patent: Feb. 7, 2017

(54) LOAD BALANCING IN A LINK AGGREGATION

(71) Applicant: Broadcom Corporation, Irvine, CA (US)

(72) Inventor: Benjamin Gale, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 14/134,652

(22) Filed: Dec. 19, 2013

(65) Prior Publication Data

US 2015/0138986 A1    May 21, 2015

Related U.S. Application Data

(60) Provisional application No. 61/905,061, filed on Nov. 15, 2013.

(51) Int. Cl.

| | |
|---|---|
| *G01R 31/08* | (2006.01) |
| *H04J 1/16* | (2006.01) |
| *H04L 12/26* | (2006.01) |
| *H04L 12/803* | (2013.01) |
| *H04L 12/709* | (2013.01) |
| *H04L 12/64* | (2006.01) |

(52) U.S. Cl.
CPC ......... *H04L 47/125* (2013.01); *H04L 12/6418* (2013.01); *H04L 45/245* (2013.01); *Y02B 60/33* (2013.01)

(58) Field of Classification Search
CPC ........ H04L 47/125; H04L 47/11; H04L 47/10; H04L 47/12; H04L 47/122; H04L 47/2441; H04L 47/2483; H04L 47/41; H04L 47/726; H04L 45/38; H04L 45/72

See application file for complete search history.

(56) References Cited

U.S. PATENT DOCUMENTS

| | | | | |
|---|---|---|---|---|
| 2006/0092971 | A1* | 5/2006 | Okita | .................. H04L 12/2854 370/468 |
| 2008/0101354 | A1* | 5/2008 | Arndt | ...................... H04L 47/10 370/389 |
| 2008/0291919 | A1* | 11/2008 | Dunbar et al. | ............. 370/395.3 |
| 2009/0158360 | A1* | 6/2009 | Diab | ....................... H04L 12/40 725/75 |
| 2010/0254409 | A1* | 10/2010 | Lu | ......................... H04L 45/125 370/477 |

(Continued)

*Primary Examiner* — Maharishi Khirodhar
(74) *Attorney, Agent, or Firm* — Sterne, Kessler, Goldstein & Fox PLLC

(57) ABSTRACT

A system for load balancing allocation of flows to egress links in a link aggregation is provided. The system includes an input port to receive a packet corresponding to a flow, a plurality of egress ports, a frame distributor coupled to the egress ports, a processor, and a memory coupled to the processor and configured to store bandwidth requirements of the flow. The system also includes a packet parsing unit configured to receive the packet from the input port, receive a first signal from the processor that programs an association of the flow the packet belongs to with an egress port based on bandwidth requirements of the flow stored in the memory, and send a second signal to the frame distributor to direct the packet to the egress port based on the association of the flow with the corresponding egress port.

20 Claims, 9 Drawing Sheets

(56) References Cited

U.S. PATENT DOCUMENTS

| | | | |
|---|---|---|---|
| 2010/0260048 A1* | 10/2010 | Dolganow | H04L 43/028 370/235 |
| 2011/0110248 A1* | 5/2011 | Koitabashi | H04L 45/00 370/252 |
| 2012/0207175 A1* | 8/2012 | Raman | H04L 47/125 370/412 |
| 2013/0308455 A1* | 11/2013 | Kapadia et al. | 370/235 |

* cited by examiner

LOAD BALANCING IN A LINK AGGREGATION

CROSS-REFERENCE TO RELATED APPLICATIONS

This application claims the benefit of U.S. Provisional Application No. 61/905,061, filed Nov. 15, 2013, which is incorporated herein by reference in its entirety.

BACKGROUND

Field of the Disclosure

This application generally related to load balancing and more specifically to load balancing in a link aggregation (LAG).

Background Art

Link aggregation (LAG) is a method of logically bundling two or more physical links to form one logical link. The "logical link" or "aggregated link" formed by a LAG can be considered to have the sum bandwidth or a bandwidth close to the sum bandwidth of the individual links that are bundled together into a link aggregation.

Link aggregations (LAGs) are also typically deployed in Ethernet switches in Information Technology (IT) networks. LAGs allow a set of Ethernet links to be aggregated into a single logical bundle such that the aggregate (i.e. the LAG) appears as a single logical port at each end of the LAG. Link aggregations offer advantages such as high capacity, since the LAG offers a single link of much greater bandwidth capacity than each individual link. Link aggregations allows for redundancy since if a physical member link fails then traffic can be automatically be moved to active links while remaining on the same logical link.

Ethernet is increasingly deployed in non-traditional networking scenarios. One such example is in Automotive Infotainment in which a small Ethernet network is used to carry content such as radio, Digital Video Disk (DVD) data, audio data, and output of a rear-facing camera. The network traffic of such networks is characterized as consisting of a relatively small number of high-bandwidth flows (unlike a typical IT network, which is more likely to consist of a large number of lower-bandwidth flows). Further, for electrical reasons, in-car networks tend to be built with lower-bandwidth connections, such that bandwidth is a more scarce and valuable resource. In such an environment, standard methods of allocating flows to LAG member links can result in an inefficient and unbalanced distribution of bandwidth amongst LAG members.

BRIEF DESCRIPTION OF THE DRAWINGS AND FIGURES

Reference will be made to the embodiments of the disclosure, examples of which may be illustrated in the accompanying figures. These figures are intended to be illustrative, not limiting. Although the embodiments presented herein are generally described, it should be understood that the embodiments are not intended to limit the scope to these particular examples.

Figure 1A:
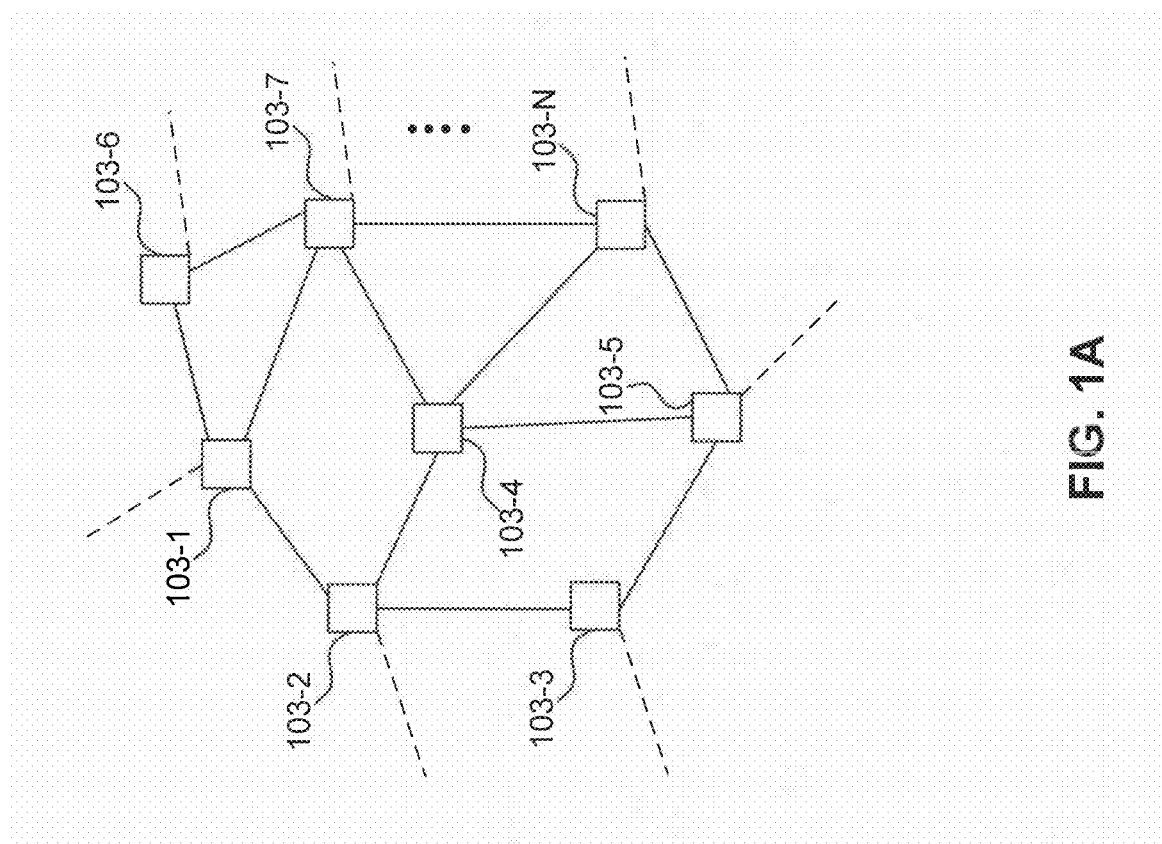
FIG. 1A illustrates an example Local Area Network with communication devices.

The embodiments of the disclosure will now be described with reference to the accompanying drawings. In the drawings, like reference numbers may indicate identical or functionally similar elements. Additionally, the left-most digit(s) of a reference number may identify the drawing in which the reference number first appears

DETAILED DESCRIPTION

This specification discloses one or more embodiments that incorporate the features of the disclosure. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For clarity and ease of illustration, not all functional blocks are illustrated in detail because these items are known to those of ordinary skill in the art, and are further defined in well-known standards. Furthermore, it is to be appreciated that similar or substitute functional blocks may be used to implement embodiments of the disclosure without deviating from the scope of the present disclosure.

Figure 4A:
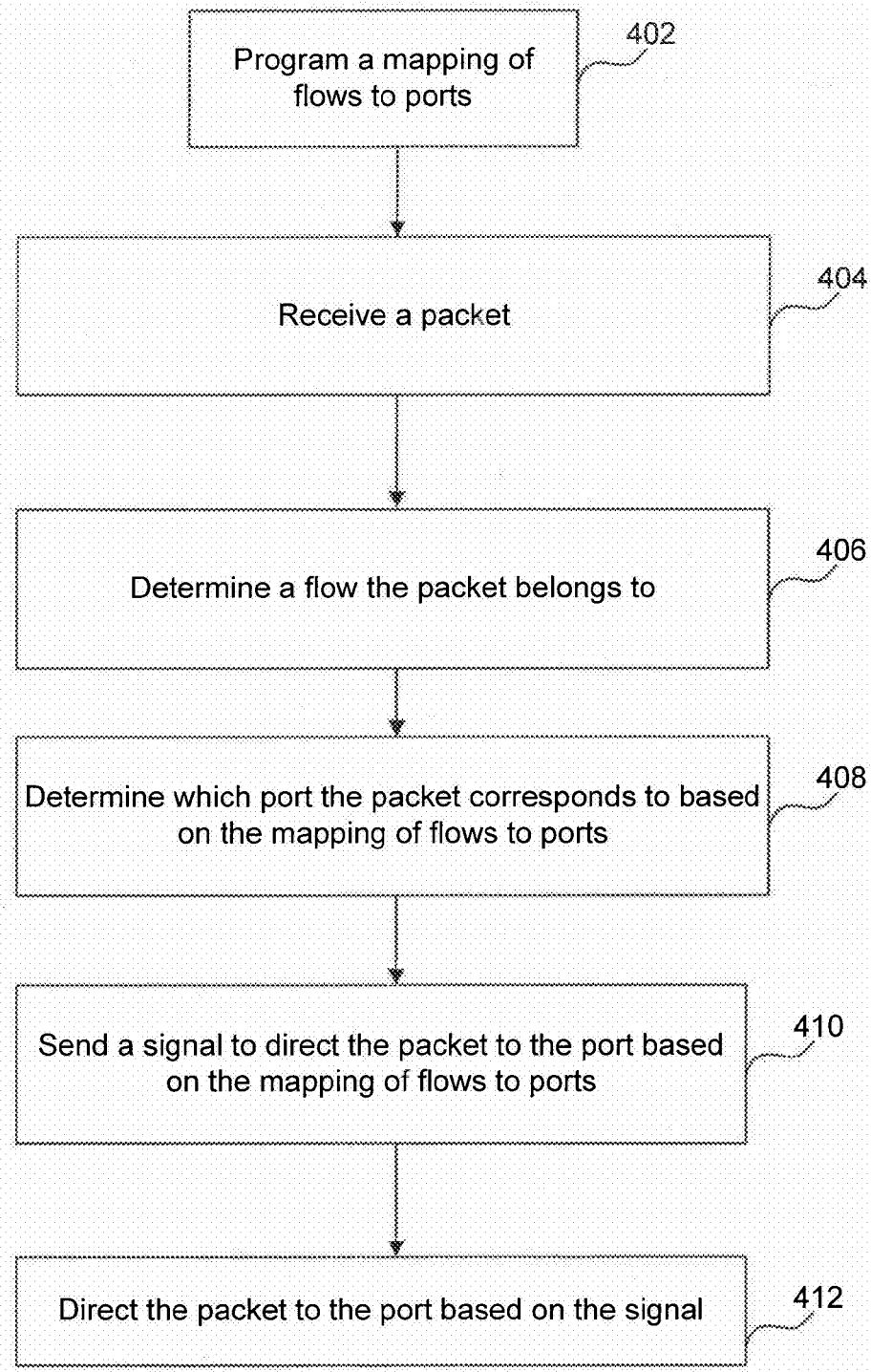
FIG. 4A illustrates an example flowchart illustrating steps performed to balance the distribution of flows to egress ports in an AVB network according to an embodiment of the disclosure.
Figure 4B:
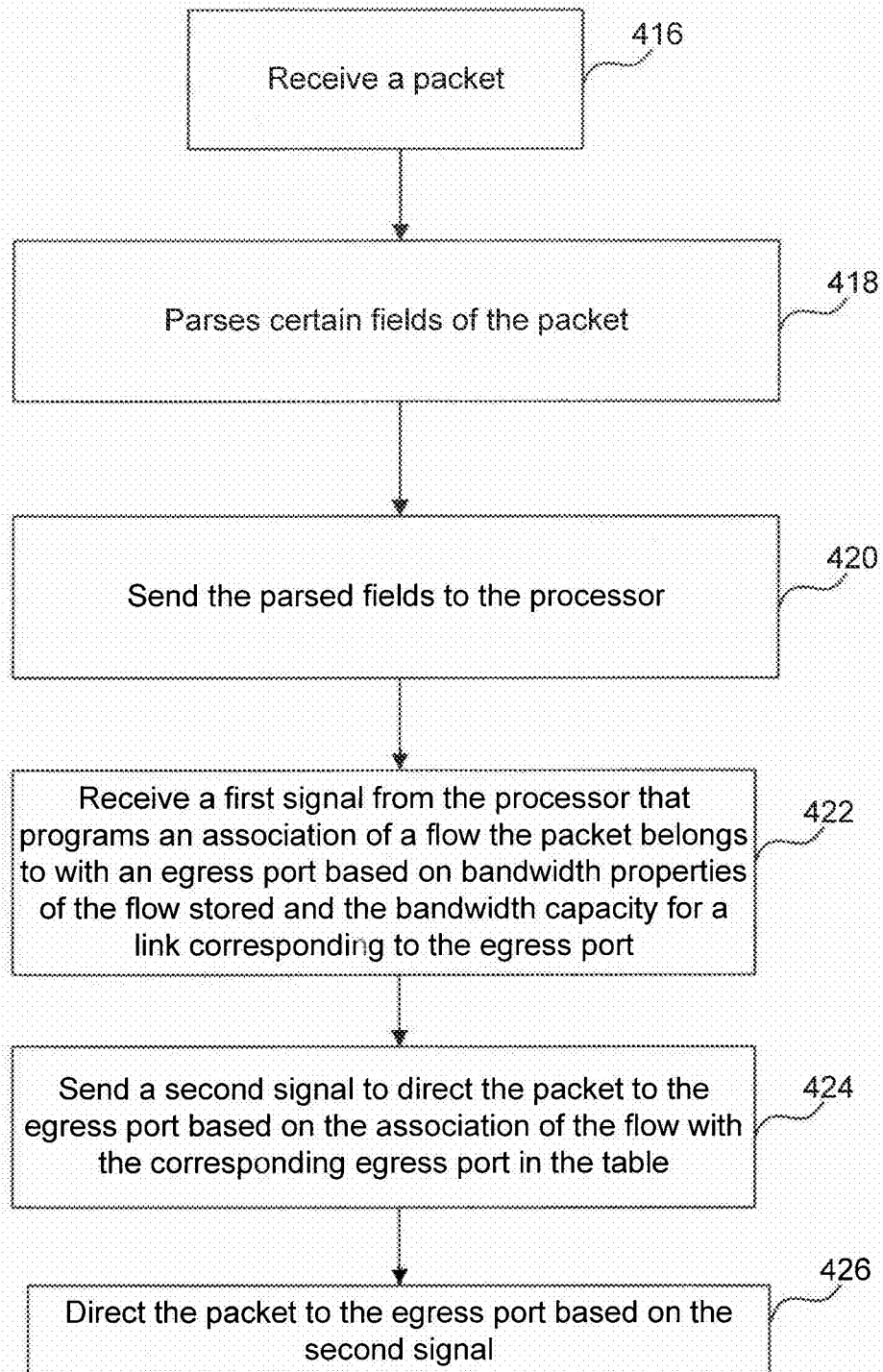
FIG. 4B illustrates an example flowchart illustrating steps performed to balance the distribution of flows to egress ports in an AVB network according to an embodiment of the disclosure.

It is also to be appreciated that for clarity and ease of illustration, not all steps are illustrated in detail in the flowcharts in FIGS. 4A and 4B because these items are known to those of relevant skill in the art, and are further defined in well-known standards. Furthermore, it is to be appreciated that similar or substitute steps may be used to implement embodiments of the disclosure without deviating from the scope of the present disclosure.

FIG. 1A illustrates an example LAN with communication devices 103-1 to 103-N coupled together. The communication devices 103 may be switches, routers or any type of device that can send and/or receive messages. Communication devices 103 may be alternatively referred to as "devices" or "network devices" herein.

A pair of communications devices 103 can exchange data and control messages over any number of physical links between them. For example, switches and routers may have multiple links connecting them for increased bandwidth and improved reliability. Multiple communications links between two devices can also be found internally within communications devices. For example, a switch fabric may connect to a network interface card using multiple communications links.

As data transmission requirements increase, it becomes important to increase the data transfer capacity between devices such as switches and routers in the end-to-end communications path. It also becomes important to accordingly increase data transfer capacity between internal components of communications devices, such as between a switch fabric and a network interface card.

Link aggregation (LAG) is a method of logically bundling two or more physical links to form one logical link. The "logical link" or "aggregated link" formed by a LAG can be considered to have the sum bandwidth or a bandwidth close to the sum bandwidth of the individual links that are bundled. The aggregated link may be considered as a single link by higher-layer protocols (e.g., network layer and above), thus facilitating data transfer at faster rates without the overhead of managing data transfer over separate physical links at the higher-layer protocols. Furthermore, the aggregated link provides redundancy when individual links fail. Typically, link aggregation is implemented at the logical link control layer/media access control layer, which is layer 2 of the Open System Interconnect (OSI) protocol stack. Since each link is coupled to a corresponding port, link aggregation results in port aggregation and the two may be referred to interchangeably when referring to directing a packet to a particular link or port in a link aggregation or a port aggregation respectively.

Link aggregations (LAGs) are also typically deployed in Ethernet switches in Information Technology (IT) networks. LAGs allow a set of Ethernet links to be aggregated into a single logical bundle such that the aggregate (i.e. the LAG) appears as a single logical port at each end of the LAG. Link aggregations offer advantages such as high capacity since the LAG offers a single link of much greater bandwidth capacity than each individual link. Another advantage is that of redundancy since if one link within a LAG fails, other links within the LAG can take up the load. A further advantage is that of management convenience in that the construct of a single logical port allows ease of management along with ease of use within other control protocols, for example, a Spanning Tree Protocol (STP) can treat the LAG as a single port, and therefore allow all links to be active.

Relatively recent standards, such as IEEE 802.3ad and IEEE 802.1ax, have resulted in link aggregation being implemented in an increasing number of communications devices. Standards such as those mentioned above include a control protocol to coordinate the setup, tear down, and management of aggregated links. Some communications devices may implement LAG techniques other than those specified in the standards.

Equal Cost Multi-Path (ECMP) routing, for example, as specified in RFC 2991-2992, is another approach to transmitting traffic from a switch or router that can be implemented using aggregated links. In the case of ECMP, the aggregated link comprises an aggregation of network paths. Each path in a particular ECMP group may be configured towards the same destination via a different next hop. A routing protocol, such as a layer 3 routing protocol, may direct packets to a destination via any of the paths configured to reach the destination.

In embodiments presented herein, the physical ports or links that are aggregated may include ports configured for Ethernet or any other protocol that allows for link aggregation. A physical port or link may be referred to herein as an "Ethernet port (link)" if that port or link operates according to the Ethernet protocol.

Herein, the term "link aggregation" or "aggregated resource" is used to refer to any of aggregated physical links, aggregated ports, aggregated virtual links, aggregated next hops, or other aggregated destination-based resources. An aggregated resource comprises one or more member resources. Accordingly, the term "member resource" refers to a physical link, physical port, virtual link, next hop, or other destination-based resource.

In large LAN networks, such as in FIG. 1A, devices 103 may arbitrarily join or leave the network. For example, a user may connect their device 103, such as a laptop, router, or a WiFi enabled device such as a cellular phone to the network for a period of time and then disconnect after using the network. Therefore, the physical configuration of the Local Area Network, and the traffic flows that it carries, is not static and is constantly changing. The "physical configuration" of devices 103 within the network refers to how the devices 103 are actually physically connected. Due to the nature of the dynamic configuration and use of a LAN, the devices 103 in the LAN do not have knowledge of the physical configuration of the LAN or the flows in the LAN. For example, it is not possible for the devices 103 to build or store a static database of physical configuration of the LAN or incoming and outgoing flows since they do not know which devices 103 are joining or leaving the LAN.

A "flow" or "traffic flow", as the term is used herein, refers to a sequence of data packets that are related. Traffic flows may be defined at various levels of granularity. For example, a flow may be created between a source and a destination (e.g., between a source address and a destination address), or between a program running on a source and a program on a destination (e.g., between source and destination addresses as well as protocol or port number). The addresses may be at the layer 2 media access control layer (MAC layer addresses), network layer (e.g. IP addresses), or other higher layer address. Port numbers or protocol identifiers can identify particular applications. The destination of a flow may be a single node or multiple nodes, such as in multicast flows from a source to multiple destinations. Packets originating from a particular application can constitute a flow. For example, audio packets may constitute an audio flow, video packets a video flow, and data packets a data flow.

In such LAN networks, various methods may be used to assign incoming traffic flows to respective member links of an aggregated resource. For example, a hashed flow identifier, where the flow identifier is determined based upon selected header field values of the packets, may be used to assign an incoming flow to one or more of the member links in the aggregated resource. Various methods are known such that the current incoming traffic can be distributed among respective member links of an aggregated resource, for example, among respective physical egress links of an aggregated link. However such methods are usually pseudo-random in nature, resulting in a distribution that is difficult to predict and control. When existing member resources are deactivated and/or when new member resources are added to the aggregated resource, it may be necessary to adjust the aggregated resource configuration so that the traffic is properly distributed between the available member links.

A conventional method of distributing incoming traffic flows to respective member resources in an aggregated resource is based upon determining a hash value for an incoming packet where the hash value based on a function such as a modulo function is applied to a combination of fields of the incoming packet and the output of the hash function specifies one of the plurality of available member resources to direct the packet to. For example, if four member resources are available in the aggregated resource, the member resources (e.g. links) are logically enumerated 0-3 by a hash function that maps members of the aggregated resource to physical links. Each incoming packet is mapped to a value between 0 and 3 and sent to the corresponding member resource.

Figure 1B:
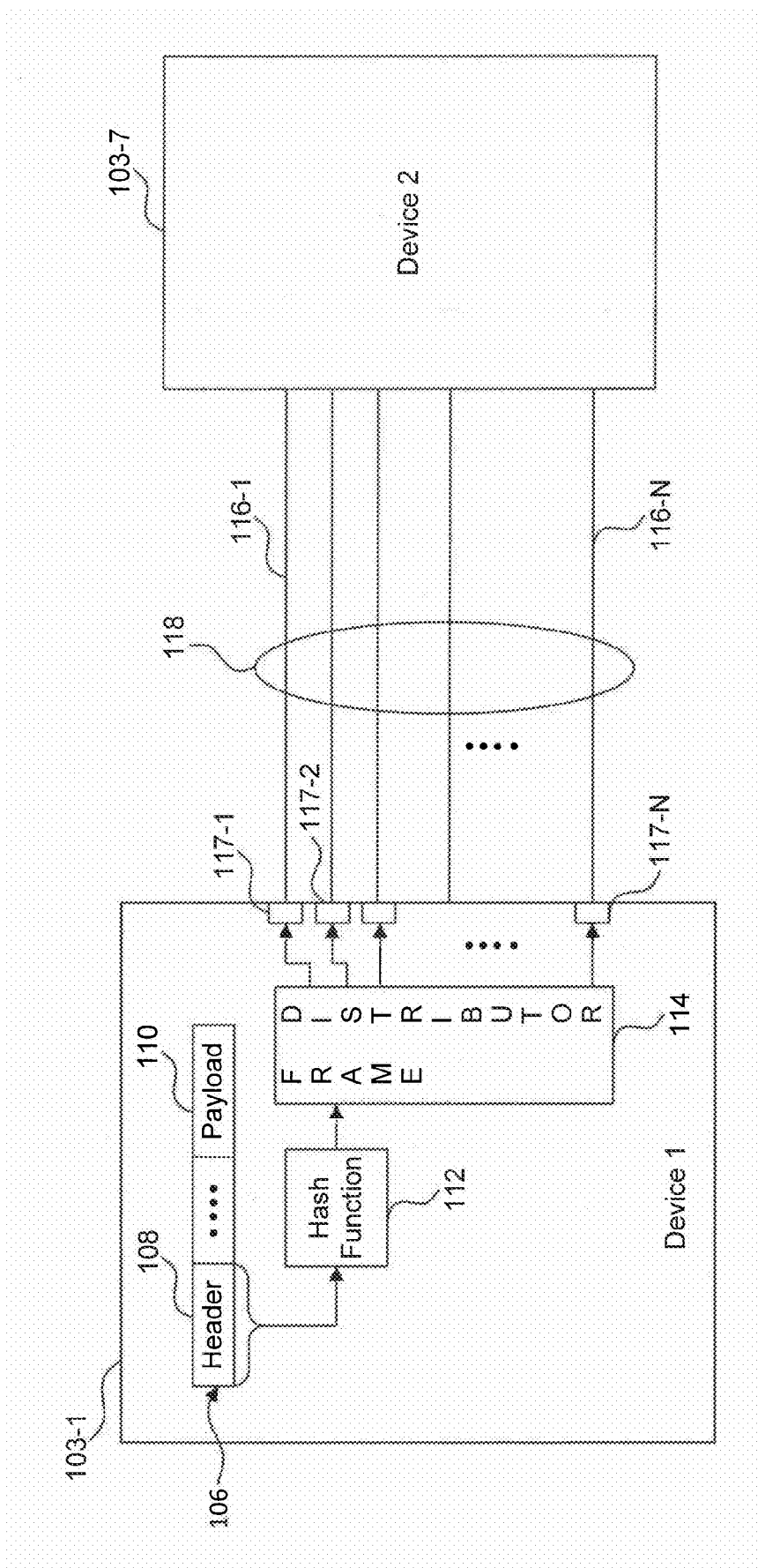
FIG. 1B illustrates an example distribution of packets to member links of a LAG in a Local Area Network (LAN) based upon a hash value.

FIG. 1B illustrates an example distribution of packets to member links of a LAG in a LAN based upon a hash value. The example in FIG. 1B only shows the communication between devices 103-1 and 103-7 for simplicity. Device 103-1 is coupled to device 103-7 via links 116-1 to 116-N. Data is transmitted to links 116 via corresponding ports 117. In the example in FIG. 1B member links 116-1 to 116-N form a logical link aggregation 118. Device 103-1 includes a hash function generator 112 coupled to a frame distributor 114. FIG. 1B also illustrates a packet 106 that includes a header 108 and a payload 110.

Typically traffic through a LAG 118 is distributed using frame distributor 114 across the LAG's member links 116 according to a fixed hash of header 108 using hash function generator 112. This allows all packets within a given flow (i.e. packets having the same packet header properties) to be allocated to the same member link 116. Such an allocation provides a traffic distribution based on probabilities since packets of different flows will have different header properties resulting in a different hash values generated by hash function generator 112. As a result of the different hash value, packets of different flows will be randomly assigned to different member links 116 for transmission. An almost equitable traffic distribution is generally true if the incoming flows are a large number of low bandwidth flows, which is typical in medium to large LANs where LAGs are most often deployed. This distribution using a fixed hash of the header is performed in hardware (e.g. using hash function generator 112) without per-flow intervention of control plane software in devices 103. The control plane software doesn't know about the bandwidth requirements or properties of individual flows, and this offers performance and scalability advantages of using a fixed hash to distribute flows over member links of a LAG.

However, Ethernet is increasingly deployed in non-traditional networking scenarios. One such example is for Automotive Infotainment, where a small Ethernet network is used to carry content such as radio, Digital Video Disk (DVD) data, and output of a rear-facing camera. The differentiating characteristics of an automotive network when compared to a standard LAN are that the automotive network carries a relatively small number of high-bandwidth flows. Because of available automotive physical layer (PHY) technology, individual link speeds are often limited to 100 Mbps. Such networks can be used to support an AVB protocol.

Figure 2A:
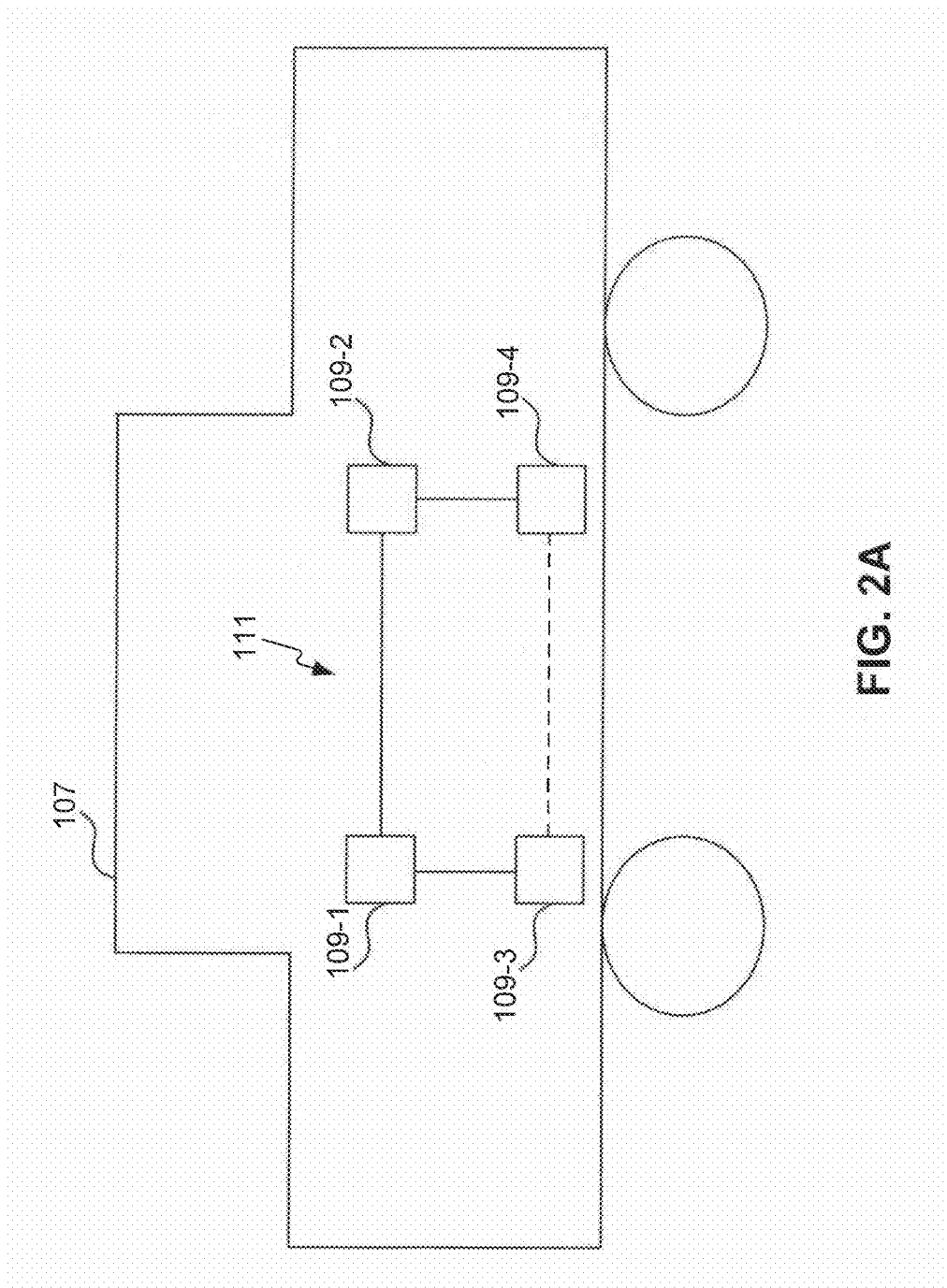
FIG. 2A illustrates an example of an AVB network in an automotive vehicle.

FIG. 2A illustrates an example of an AVB network in an automotive vehicle 107. The automotive vehicle may be, for example, any type of car and can include airplanes, trains and ships. The automotive network in FIG. 2A includes devices 109-1 to 109-4 coupled together in a ring configuration 111. It is to be appreciated that devices 109 may be in another configuration besides a ring configuration. The ring configuration 111 of devices 109 may be referred to as a ring network herein.

In an automotive network, the devices 109 are typically not arbitrarily joining or leaving the automotive network and are therefore in a static physical configuration. For example, a DVD player, GPS, or rear-view camera installed in an automotive vehicle 107 will be part of the network unless physically uninstalled. Furthermore, in an automotive network it is possible for each of the devices 109 to build or store a static database of expected flows since the devices 109 know the static physical configuration of the automotive network and the traffic flows it will carry.

AVB introduces traffic classes that offer delivery and latency guarantees for traffic of a particular class. For example, video flows may form a first class and audio flows may form a second class that are provided guaranteed bandwidth to support respective bandwidth needs. In AVB networks, in order to offer such guarantees, each device on an end-to-end path reserves and provisions for each flow in the class. Typically there may be very little non-AVB traffic in AVB networks.

The characteristics of a small number of bandwidth intensive flows in an automotive network increase the need for link aggregations to get the capacity and redundancy benefits provided by such Aggregations. However, use of LAGs in AVB networks present challenges for the use of traditional distribution methods (such as a fixed hash) for load balancing between member links of a LAG. However according to an embodiment, the control plane processor in a device 103 has knowledge of all the flows in the device 103, which offers a potential solution.

Figure 2B:
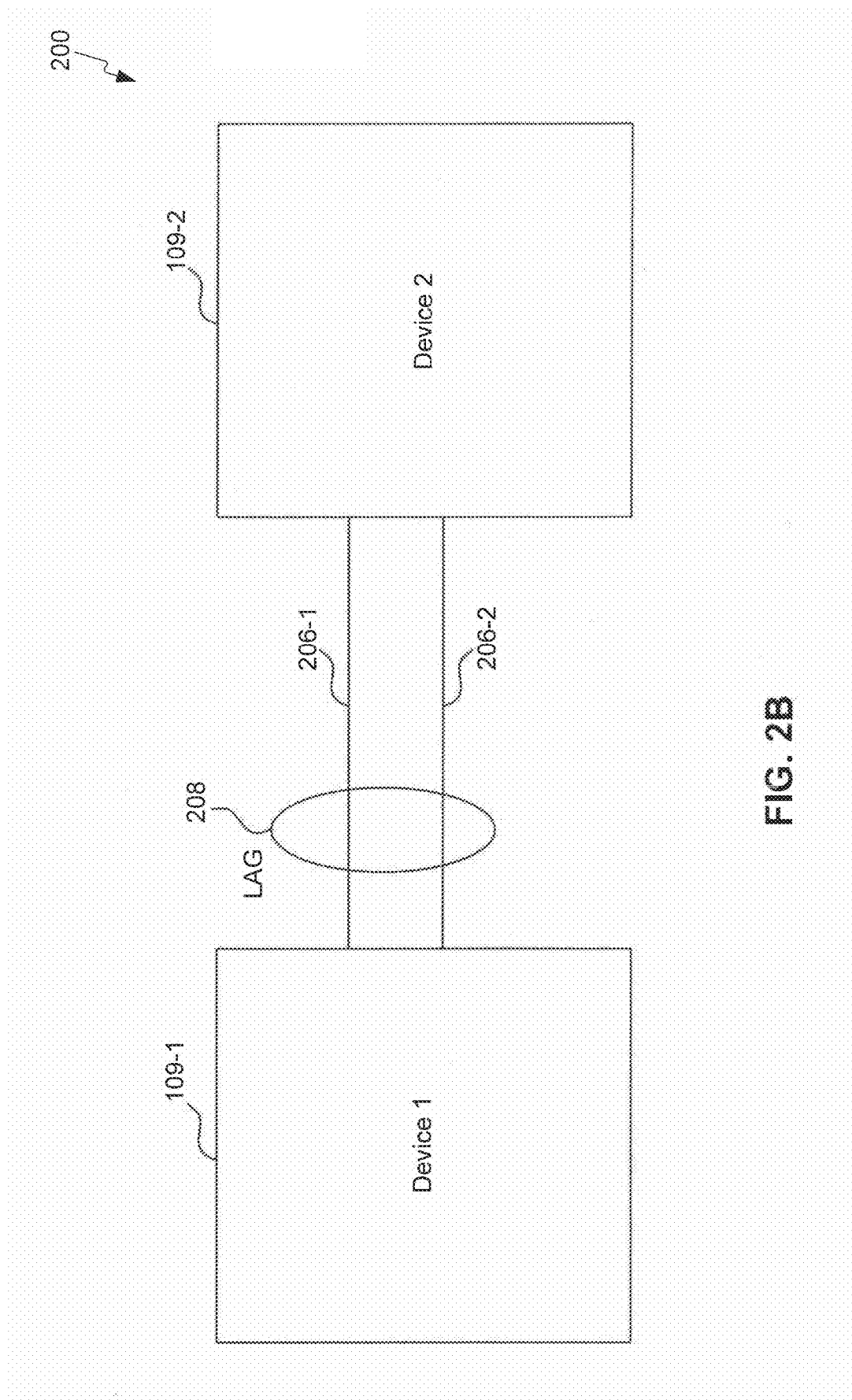
FIG. 2B illustrates an example system that includes a LAG in an Audio Visual Bridging (AVB) network.

FIG. 2B illustrates an example system 200 that includes a LAG in an AVB network. FIG. 2B shows communication between devices 109-1 and 109-2 for simplicity. A LAG 208 that includes member links 206-1 and 206-2 couples devices 109-1 and 109-2. In this example, link 206-1 and 206-2 can each carry 100 Mbps and as a result, LAG 208 can provide a combined bandwidth of 200 Mbps.

In the example in FIG. 2B, packets from three flows (flow A, B, and C) are to be carried from device 109-1 to 109-2. For example, flow A may need a bandwidth of 50 Mbps, flow B may need a bandwidth of 40 Mbps, and flow C may need a bandwidth of 30 Mbps. Since the sum of bandwidths for each flow exceeds the capacity of a single 100 Mbps link, such as link 206-1 or 206-2, a link aggregation 208 that combines the bandwidth of links 206-1 and link 206-2 provides a suitable construct to increase the inter-device capacity.

However, with traditional LAGs, the choice of member link for each flow to take is governed by the hash of the content of the packet headers for that flow as explained above in FIG. 1B. In a conventional LAG, device 109-1 would not be able to control the allocation of flows A, B, and C between member links 206 of LAG 208 since the output of a hash function is fixed and is independent of bandwidth requirements of a flow. In the worst-case scenario, the hash function will assign all of flows A, B, and C to the same link e.g. link 206-1. In that case, device 109-1 cannot guarantee that the LAG 208 has capacity for all 3 flows and so may need to reject the reservation for at least one of the flows A, B, or C. However, according to an embodiment of the disclosure, device 109-1 may pre-store or build a database of flow characteristics such as bandwidth requirements for each of the flows A, B, and C.

According to embodiments presented here, device 109-1, instead of using an output of a hash function, can make an explicit decision based on the bandwidth requirements of flows to optimally balance the flows across link members 206. Embodiments presented herein provide means for software to make an explicit allocation of a flow to a member link of a LAG based upon a load balancing calculation and characteristics of the flow. This allocation can be programmed into hardware, e.g. a flow to link member allocation table. Once the allocation has been programmed or stored into hardware, it can be used by a frame distributor to route packets from a particular flow to a member link 206 based on the programming. For example, based on the embodiments presented herein, device 109-1 could put flow A on link 206-1, and flows B and C on link 206-2 and thereby efficiently use the available bandwidth of member links 206 of LAG 208.

Figure 3A:
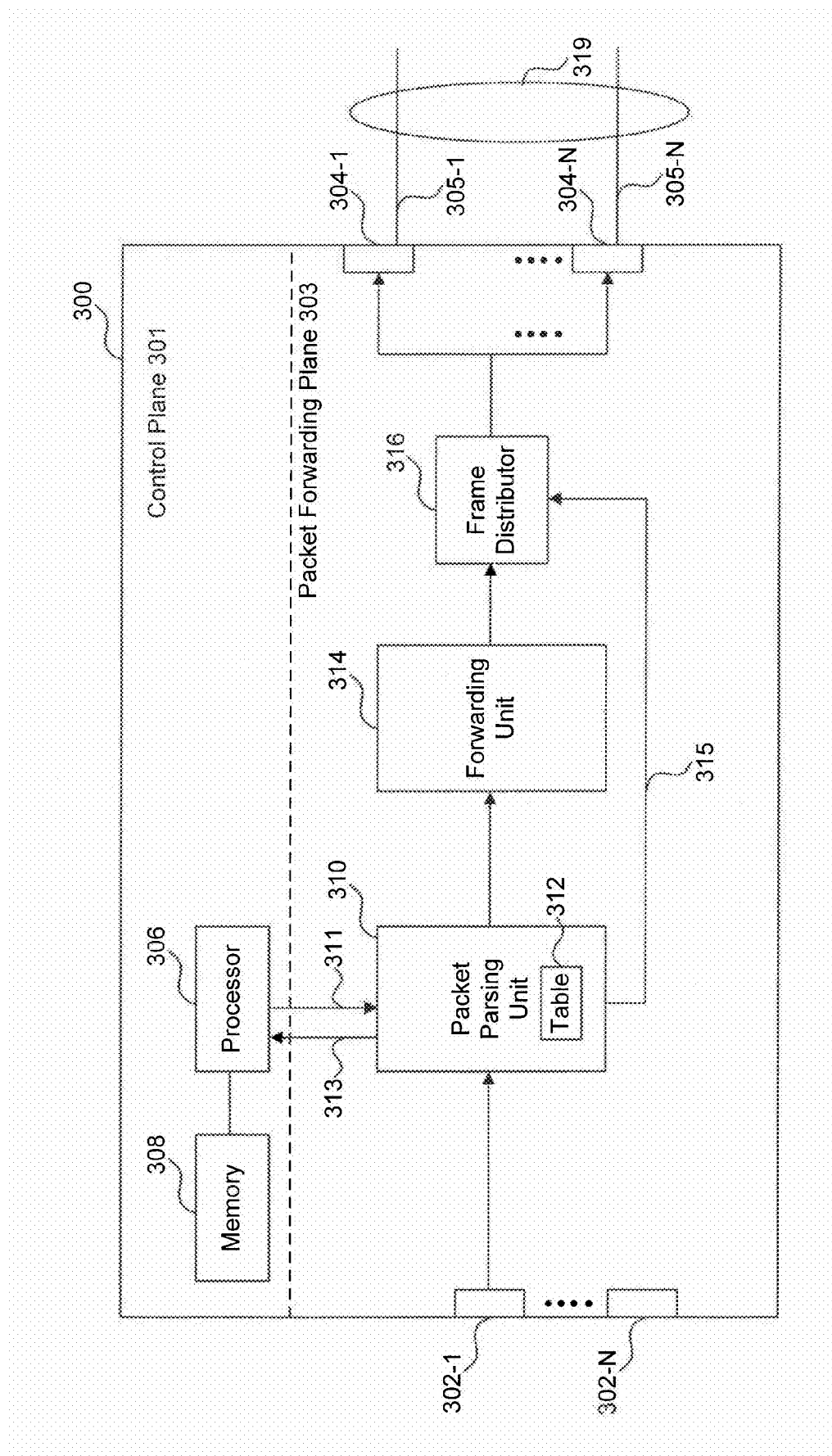
FIG. 3A illustrates an example device according to an embodiment of the disclosure.

FIG. 3A illustrates an example device 300 according to an embodiment of the disclosure. Device 300 includes a control plane 301 and a packet forwarding plane 303. Control plane 301 includes a processor 306 coupled to a memory 308. The packet forwarding plane 303 includes input ports 302-1 to 302-N coupled to packet parsing unit 310 that is in turn coupled to a forwarding unit 314. Forwarding unit 314 is coupled to frame distributor 316 that is in turn coupled to egress ports 304-1 to 304-N. Egress ports 304-1 to 304-N are coupled to links 305-1 to 305-N respectively. Links 305-1 to 305-N and correspondingly ports 304-1 to 304-N may be configured into one or more link aggregations such as link aggregation 319. Processor 306 is coupled to parsing unit 310 thereby coupling control plane 301 to packet forwarding plane 303. According to an embodiment, parsing unit 310 includes a table 312.

Input ports 302-1 to 302-N receive packets corresponding to different flows. A flow may be, e.g., an audio, video, voice, or data flow. In an example, memory 308 stores characteristics, such as bandwidth requirements, incoming ports, source address, and destination address of packets, for all flows. It is a feature of the embodiments presented herein to store such a database of properties of flows since device 300 is part of an automotive network with a static configuration and therefore, knows of all the incoming and outgoing flows.

In a first example, there is a static database in memory 308 that stores flow characteristics such as the source address, destination address, and input port information.

In a second example, processor 306 dynamically builds the database of flow characteristics by monitoring 802.1Qat messages. 802.1Qat is a stream reservation protocol (SRP). 802.1Qat messages are used for stream reservations and by monitoring such messages, processor 306 can determine which flows will be serviced by a device. This information is used to dynamically build a database of flows in memory 308 that maps packet characteristics such as the source address, destination address, and input port information to corresponding flows.

Processor 306 also stores the link aggregation configurations of ports 304-1 to 304-N. In an embodiment, based on the bandwidth requirements of a flow, processor 306 assigns the flow, and as a result the packets corresponding to the flow, to a port 304 coupled to a link 305. As described above in FIG. 2B, if flow A requires a bandwidth of 50 Mbps, then it may be assigned to a link of 305 that can support the bandwidth requirements of flow A. Processor 306 programs table 312 in packet parsing unit 310 with the mapping of flows to ports 304. The mapping may be of flows to link members 305 or of flows to ports 304. Since each port 304 corresponds to a single link 305, the association of flows to ports 304 or flows to links 305 will have the same effect for mapping and directing packets to the appropriate link 305 for transmission. The flow may be identified by a packet header type or header characteristics such as source address, destination address, and ingress port. This assignment of flows to ports 304 may be programmed by processor 306 during initialization.

In another embodiment, parsing unit 310 receives a packet from an input port 302. Packet parsing unit 310 may be programmed by processor 306 to parse certain fields of the packet. Processor 306 may determine the fields to be parsed based on instructions stored in memory 308. Packet parsing unit 310 parses the fields of the packets and sends the parsed fields to processor 306 via signal 313. Processor 306 determines a flow that the packet belongs to based on the parsed fields and a database of flows stored in memory 308. For example, based on parsed fields such as the source address, the destination address or the incoming port for the packet, and the database of expected flow characteristics, the processor 306 is able to determine the flow that the packet belongs to. This embodiment checks whether packets for a flow are actually present before programming packet parsing unit 310 with the mapping of that flow to one or more ports 304. This prevents wasteful allocation of resources in the event packets corresponding to a flow never arrive. Once processor 306 determines that packets corresponding to a flow are actually present, processor 306 can then program packet parsing unit 310 with the mapping of that flow to one or more ports 304.

Figure 3B:
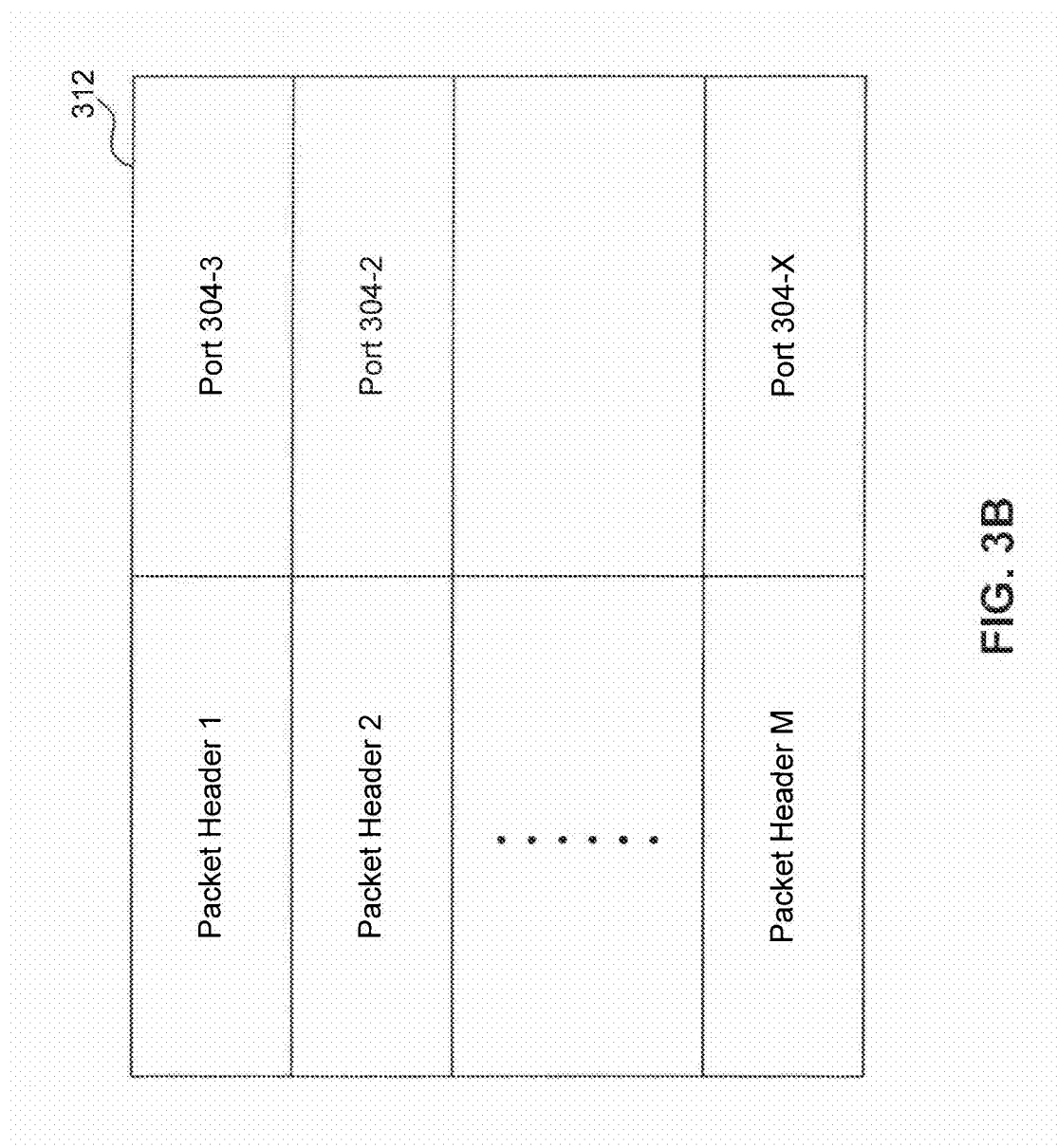
FIG. 3B illustrates a table according to an embodiment of the disclosure.

FIG. 3B illustrates a table 312 according to an embodiment of the disclosure. In the example in FIG. 3B, packet headers are associated with ports 304. The packet headers indicate a corresponding flow. For example, all the packets of a particular flow will have similar packet header characteristics such as source address and destination address. Therefore the table 312 is essentially storing a mapping of flows to ports 304. In an example, table 312 stores the mapping of flows to links 305 which is essentially the same as a mapping of flows to ports 304 since each egress port 304 is coupled to a single link 305. Thus the table can store a mapping a flows to ports 304 or flows to links 305. Table 312 may be implemented in hardware, software, firmware, or any combination thereof. Table 312 may be stored or located in a memory (not shown) in parsing unit 310. Alternatively, table 312 may be stored in any memory (not shown) that can be located anywhere within device 300.

Once table 312 has been programmed with the association of flows to ports 304, the packet forwarding plane 303 takes over and the software in the control plane 301 does not take part in the forwarding of packets to egress port 304. This significantly speeds up the process in that software control is not required to decide which packets go to which links 305. Packet parsing unit 310 forwards incoming packets to forwarding unit 314 that in turn forwards the packet to fume distributor 316. Packet parsing unit 310 sends a signal 315 to frame distributor 316 that indicates which egress port 304 is to be used for transmitting a particular packet to a particular port 304.

According to an embodiment, packet parsing unit 310 based on a packet's header and the mapping programmed in table 312 determines which flow the packet belongs to and the corresponding port 304 that the packet should be directed to. Frame distributor 316 based on the signal 315 from packet parsing unit 310 directs the packet to the corresponding port 304. Once table 312 has been programmed, all packets corresponding to a particular flow are directed to the corresponding egress port by packet parsing unit 310 without further interaction with processor 306 thereby significantly speeding up packet forwarding while providing load balancing. In embodiments presented herein, processor 306 is an out-of-band processor. An out-of-band processor is a processor that is not involved in the forwarding of packets to ports 304 and only programs system elements, e.g. packet parsing unit 310, which then takes over the process of deciding which port 304 to forward a packet to based on the programming. By using this flow based mapping, frame distributor 316 avoids the load balancing issues of conventional systems that use a hash of the packet header to determine which port 304 a packet will be directed to.

In some examples, if a mapping of a flow to a particular egress port is not provided by processor 306, or is not available in table 312, frame distributor 316 may compute a hash of the packet header and direct the packet to the egress port based on the output of the hash algorithm. In another example, if a link 305 coupled to a corresponding port 304 becomes inactive and the processor 306 has not had a chance to re-map flows directed towards the inactive link to active links, the parsing unit 310 will continue to select a the inactive link that is not available to the frame distributor 316. In this case, frame distributor 316 may use a hash algorithm to re-direct flows from the inactive link 305 to active links 315 while waiting for processor to re-map flows to active links.

FIG. 4A illustrates an example flowchart 400 illustrating steps performed to balance the distribution of flows to egress ports in an AVB network according to an embodiment of the disclosure. Flowchart 400 will be described with continued reference to the example operating environment depicted in FIGS. 2A-3B. However, the flowchart is not limited to this embodiment. Note that some steps shown in flowchart 400 do not necessarily have to occur in the order shown. The steps in FIG. 4 are performed, for example, by device 300.

In step 402, a mapping of flows to ports is generated. For example, processor 306 programs packet parsing unit 310 with a mapping of flows to ports based on a pre-programmed database of expected flows in memory 308.

In step 404, a packet is received. For example, packet parsing unit 310 receives a packet via ports 302.

In step 406, a flow that the packet belongs to is determined based on fields of the packet. For example, packet parsing unit 310 determines which flow the packet belongs to based on fields such as a source address, a destination address, or an incoming port for the packet.

In step 408, a determination is made of which port the packet corresponds to based on the flow associated with the packet. For example, packet parsing unit 310 determines to which port 304 the packet should be directed to based on mappings of flows to ports in step 402.

In step 410, a signal is sent to direct the packet to a port based on the mapping of flows to ports. For example, signal 315 is sent by packet parsing unit 310 to frame distributor 316 to direct the packet to a mapped port 304.

In step 412, the packet is directed to the corresponding port. For example, frame distributor 316 directs the packet to the corresponding mapped port 304 based on signal 315.

FIG. 4B illustrates an example flowchart 401 illustrating steps performed to balance the distribution of flows to egress ports in an AVB network according to an embodiment of the disclosure. Flowchart 400 will be described with continued reference to the example operating environment depicted in FIGS. 2A-3B. However, the flowchart is not limited to this embodiment. Note that some steps shown in flowchart 400 do not necessarily have to occur in the order shown. The steps in FIG. 4 are performed, for example, by device 300.

In step 416, a packet is received. For example, packet parsing unit 310 receives a packet from an ingress port 302.

In step 418, fields of a packet are parsed. For example, packet parsing unit 310 parses certain fields of a packet such as source address and destination address.

In step 420, the parsed fields are sent to the processor. For example, packet parsing unit 310 sends the parsed the fields via signal 313 to processor 306. Packet parsing unit 310 may also send incoming source port to the processor 306.

In step 422, a first signal is received from the processor that programs an association of a flow that the packet corresponds to with a port 304 based on bandwidth requirements of the flow stored in database in memory 308. For example, processor 306 programs packet parsing unit 310 via signal 311 to forward the current packet and all packets corresponding to the same flow to a particular port 304 based on bandwidth requirements of the flow stored in memory 308.

In step 424, signal 315 is sent to direct a packet to the port based on association of the flow with the corresponding port in the table. For example, packet parsing unit 310 based on the association of flows to ports 304 sends a signal 315 to frame distributor 316 that directs the packet to the corresponding port 304.

In step 426, the packet is directed to the corresponding link. For example, frame distributor 316 directs the packet (all subsequent packets corresponding to the same flow) to the corresponding mapped port 304 based on signal 315.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 5:
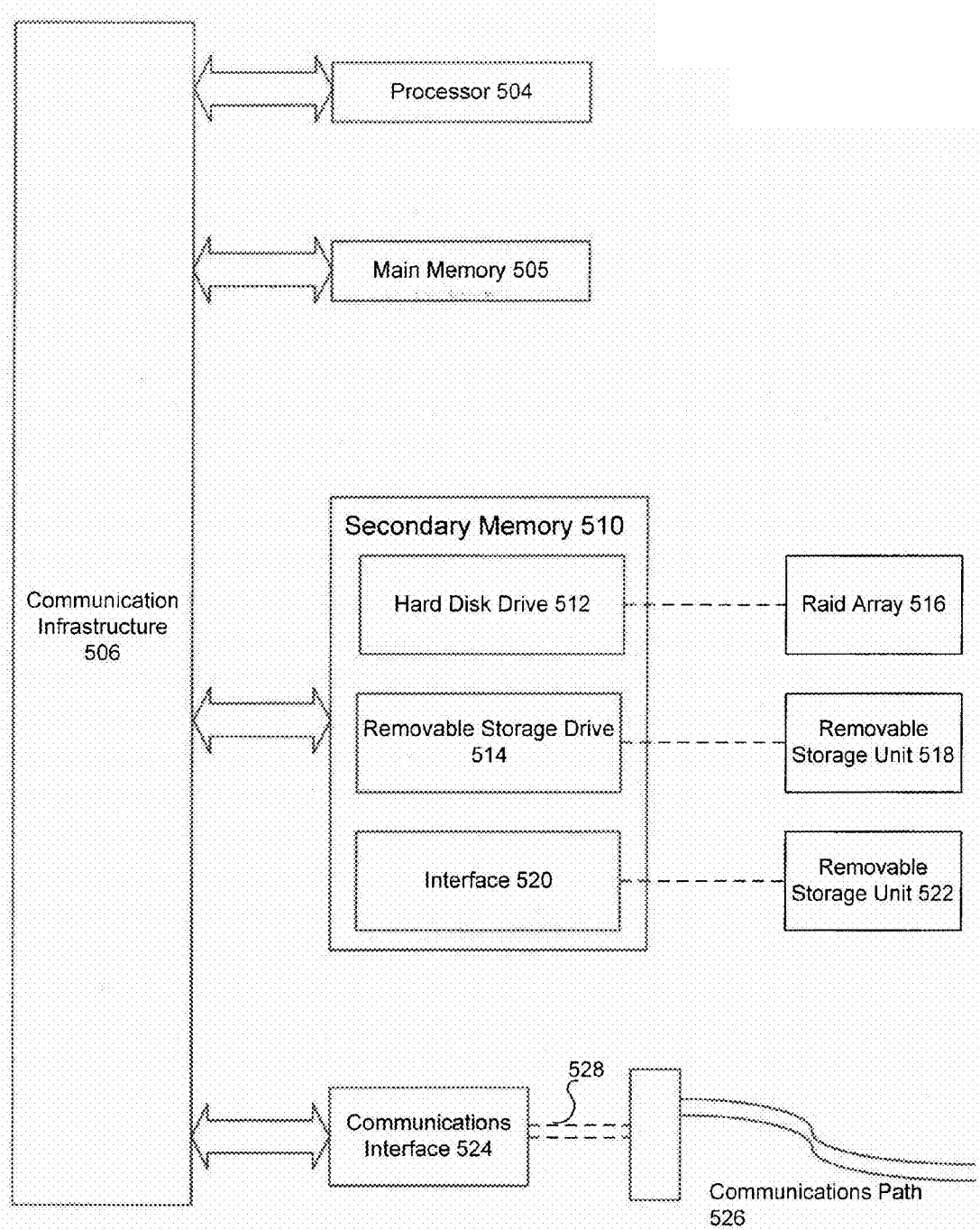
FIG. 5 is a block diagram of a computer system on which the present embodiments can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518 represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc. Software and data transferred via communications interface 524 are in the form of signals 528 which may be electronic, electromagnetic, optical, or other signals capable of being received by communications interface 524. These signals 528 are provided to communications interface 524 via a communications path 526. Communications path 526 carries signals 528 and may be implemented using wire or cable, fiber optics, a phone line, a cellular phone link, an RF link and other communications channels.

The terms "computer program medium" and "computer usable medium" are used herein to generally refer to media such as removable storage drive 514, a hard disk installed in hard disk drive 512, and signals 528. These computer program products are means for providing software to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes of the present disclosure. For example, when executed, the computer programs enable processor 504 to implement part of or all of the steps described above with reference to the flowcharts herein. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A system, comprising:
   an input port configured to receive a packet belonging to a flow;
   a plurality of egress ports;
   a frame distributor, coupled to the plurality of egress ports, configured to direct the packet to an egress port from among the plurality of egress ports based on the flow;
   a processor configured to determine a field of the packet that is to be parsed;
   a memory, coupled to the processor, to store bandwidth requirements of the flow; and
   a packet parsing unit configured to:
      receive the packet from the input port,
      parse the determined field of the packet,
      determine the flow that the packet belongs to using the parsed field as an index to a table,
      if the parsed field is not included within the table:
         send the parsed field of the packet to the processor, wherein the processor is further configured to compare the parsed field with a plurality of expected flow characteristics to determine the flow,
         receive a first signal from the processor to update the table with an association of the flow with an egress port from among the plurality of egress ports based on the parsed field and the stored bandwidth requirements of the flow, and
         send a second signal to the frame distributor to direct the packet to the egress port based on the association of the flow with the egress port.

2. The system of claim 1, wherein the packet parsing unit is further configured to direct any packets belonging to the flow to the egress port for transmission based on the association of the flow.

3. The system of claim 1, wherein the field comprises: a source address, a destination address, or an ingress port of the packet.

4. The system of claim 1, wherein the egress port and at least a second egress port from the plurality of egress ports form a Link aggregation (LAG),
   wherein the LAG comprises a grouping of the egress port and at least the second egress port into a single logical egress port.

5. The system of claim 1, wherein the processor is configured to, based on instructions stored in the memory, build a database associating incoming and outgoing flows with their corresponding bandwidth requirements.

6. The system of claim 1, wherein the processor is not configured to determine the egress port to direct the packet to based on a hash of a header or other fields of the packet.

7. The system of claim 1, wherein the plurality of egress ports comprises part of a Link aggregation (LAG), and
wherein an underlying network comprises an Audio Visual Bridging (AVB) network in an automotive vehicle.

8. The system of claim 1, wherein the processor is further configured to, based on instructions stored in the memory, only program the packet parsing unit with an association of the flow with the egress port and not direct the packet to the egress port based on the association of the flow.

9. The system of claim 1, wherein the processor is configured to associate the flow with the egress port based on bandwidth capacity of links in a link aggregation and available bandwidth capacity of the links.

10. A method, comprising:
parsing a field of a packet belonging to a flow;
determining the flow that the packet belongs to using the parsed field as an index to a table,
if the parsed field is not included within the table:
sending the parsed field of the packet to a processor;
comparing, using the processor, the parsed field with a plurality of expected flow characteristics to determine the flow,
receiving a first signal from the processor; and
updating, in response to the first signal, the table with an association of the flow with an egress port from a plurality of egress ports, based on bandwidth requirements of the flow stored in a memory; and
sending a second signal to a frame distributor to direct the packet to the egress port based on the association of the flow with the egress port.

11. The method of claim 10, further comprising:
directing packets for the flow to the egress port for transmission based on the association of the flow with the egress port.

12. The method of claim 10, wherein the egress port along with at least a second egress port from among the plurality of egress ports form a Link aggregation (LAG), wherein the LAG comprises a grouping of the egress port and at least the second egress port into a single logical egress port.

13. The method of claim 10, further comprising: building a database associating incoming and outgoing flows with their corresponding bandwidth requirements.

14. The method of claim 10, further comprising: determining the flow based on a source address, a destination address, or an ingress port of the packet.

15. The method of claim 10, further comprising: not determining the egress port to direct the packet to based on a hash of a header or other fields of the packet.

16. The method of claim 10, wherein the plurality of egress ports comprises part of a Link aggregation (LAG) and an underlying network comprises an Audio Visual Bridging (AVB) network in an automotive vehicle.

17. A system, comprising:
a memory to store bandwidth requirements of a flow;
an input port configured to receive a packet belonging to the flow;
a processor configured to determine a field of the packet that is to be parsed;
a plurality of egress ports configured into a link aggregation;
a frame distributor; and
a packet parsing unit configured to:
receive the packet from the input port,
parse the determined field of the packet,
determine the flow that the packet belongs to using the parsed field as an index to a table,
if the parsed field is not included within the table:
send the parsed field of the packet to the processor, wherein the processor is further configured to compare the parsed field with a plurality of expected flow characteristics to determine the flow, and
update the table with an association of the flow with an egress port from among the plurality of egress ports based on the parsed field and the stored bandwidth requirements of the flow, and
direct the packet, using the frame distributor, to an egress port in the link aggregation based on the association of the flow, wherein the association of the flow is based on the stored bandwidth requirements.

18. The system of claim 17, further comprising:
a processor, coupled to the memory and the packet parsing unit, configured to send a signal to the packet parsing unit to program the association of the flow based on the stored bandwidth requirements.

19. The system of claim 17,
wherein the packet parsing unit is further configured to send a signal to the frame distributor to direct the packet to the egress port.

20. The system of claim 17, wherein the plurality of egress ports comprises part of a Link aggregation (LAG), and
wherein an underlying network comprises an Audio Visual Bridging (AVB) network in an automotive vehicle.

* * * * *